Patented Aug. 4, 1936                                                             2,049,415

UNITED STATES PATENT OFFICE

2,049,415

TREATMENT OF RUBBER

Ernest B. Curtis, Yonkers, N. Y., assignor to United States Rubber Products, Inc., New York, N. Y., a corporation of Delaware No Drawing. Application August 27, 1935, Serial No. 38,061

6 Claims. (Cl. 91—68)

This invention relates broadly to the art of treating rubber or rubber compounds and more particularly to an improved procedure for the vulcanization of certain types of goods in the presence of an organic accelerator whereby to overcome the tendency to become porous, and without sacrificing other desired properties of the product.

In the art of rubber manufacture, particularly as applied to goods which are cured in steam such as rubber insulated wire, especially the light or white variety, it has been found that the vulcanized rubber coating sometimes becomes porous during the cure. This formation of porosity is particularly troublesome with so-called superaging types of insulation. Such porosity injures the physical and electrical properties of the insulation. The superaging type of composition is characterized by containing much less sulfur than is commonly used in rubber compounding, usually one percent or less by weight based on the rubber, and a much higher proportion of very active accelerating materials than is customary. Rubber compounds are fixed by trade specifications for various uses, which specifications are required to be maintained. This is particularly true in the wire insulation art, in which the highest specifications require the use of the super aging type of compound adapted to curing in steam. This is usually done by burying the coated wire in talc or soapstone and curing in live steam.

One of the objects of the invention is to prevent the development of porosity in rubber articles during vulcanization in steam, particularly in insulated wire stocks which are accelerated by an organic accelerator of the thiuram sulphide class alone or in conjunction with one or more accelerators of other types. Another object of the invention is to provide a means of preventing said porosity without sacrificing other desired physical properties of the product. Other objects will be apparent from the following description.

It has been found that when magnesium oxide is combined in certain small proportions with the organic accelerator in the rubber stock that after the cure in steam, the stock is non-porous and has improved physical properties both before and after aging and further that there is no material change in the scorch characteristics of the stock. Zinc oxide, antimony oxide, antimony pentoxide and litharge used in the same and varying amounts did not overcome porosity as did magnesium oxide. The objects of the invention are best attained by keeping the magnesium oxide content based on the rubber below approximately 1% by weight preferred amounts being around 0.5 part by weight based on 100 parts by weight of the rubber. Larger amounts may be used but the larger the amount the greater the tendency to increase the water absorption and thus decrease the electrical properties after water immersion.

The following example is given to illustrate the invention, the parts being by weight:

Example 1

A light colored wire insulation compound was prepared by mixing the following ingredients:

|  | Parts |
|---|---|
| Rubber | 100.00 |
| Paraffin wax | 3.00 |
| Whiting | 100.00 |
| Zinc oxide | 100.00 |
| Acetone-diphenylamine condensate—(anti-oxidant) | 2.00 |
| Sulphur | .40 |
| Tetramethyl thiuram monosulphide (accelerator) | 2.60 |

This is referred to as stock A in the tests and the same stock containing an added amount of .5 part of heavy calcined magnesia is referred to as stock B.

The stocks were buried in talc and vulcanized in live steam as known in the insulated wire industry. Vulcanization was carried out with a 15 minute rise to 25 pounds per sq. inch steam pressure and then held at that pressure for 45, 60 and 75 minutes respectively with stocks A and B. Stock A was porous due to blowing during the vulcanization. Stock B was well vulcanized, solid and free from porosity. The tensiles, unaged and aged, as well as scorch characteristics of the stocks are given in the table below.

| Unaged | | | | |
|---|---|---|---|---|
| | Stock A | | Stock B | |
| Cure | T | E | T | E |
| 45′ | 1210 | 426 | 1900 | 523 |
| 60′ | 1140 | 410 | 1900 | 516 |
| 75′ | 1280 | 426 | 1900 | 526 |
| Aged (40 days in oxygen) | | | | |
| 45′ | 1020 | 353 | 1480 | 450 |
| 60′ | 810 | 333 | 1420 | 460 |
| 75′ | 820 | 330 | 1360 | 453 |

| 5 pounds/sq. in. steam pressure press cure | | | | |
|---|---|---|---|---|
| (Scorch test) | | | | |
| | T | E | T | E |
| 20′ | No cure | | No cure | |
| 30′ | 110 | 767 | 300 | 510 |
| 45′ | 347 | 630 | 555 | 525 |
| 60′ | 531 | 572 | 678 | 507 |

T refers to tensile strength in lbs./sq. in. at break; E refers to per cent elongation at break.

Good results have also been obtained with the type of magnesium oxide known to the trade as light calcined magnesia.

Instead of the monosulphide, other thiuram sulphides may be used such as the polysulphides, for example, tetramethyl thiuram disulphide, or di-pentamethylene thiuram tetrasulphide, or others. Examples of other accelerators that may be used therewith are the mercaptobenzothiazoles and their derivatives including such as dibenzothiazyl disulphide.

The thiuram sulphides, however, have been found to serve more effectually in wire insulation stocks to give goods of the desired characteristics.

Many different embodiments of this invention may be made without departing from the spirit thereof, and it is to be understood that I do not limit myself to the foregoing examples or description except as indicated in the following claims.

Having thus described my invention, what I claim and desire to protect by Letters Patent is:

1. A method of preventing blowing of wire insulation rubber compounds during vulcanization thereof in steam which comprises incorporating in the rubber stock some but not more than approximately one per cent by weight based on the rubber of magnesium oxide powder in addition to an organic type of accelerator, coating a wire therewith, and vulcanizing the rubber coated wire in steam.

2. A method of preventing blowing of wire insulation rubber compounds during vulcanization thereof in steam which comprises incorporating in the rubber stock about .5 per cent by weight of magnesium oxide based on the rubber in addition to a thiuram sulphide vulcanization accelerator, coating a wire therewith, and vulcanizing the rubber coated wire in steam.

3. A rubber insulated wire, the rubber portion of which is of the super-ageing type and normally adapted for curing in steam, which rubber portion is characterized in containing besides a thiuram sulphide accelerator, some but not more than approximately 1% by weight based on the rubber of magnesium oxide whereby to prevent porosity during the cure in steam.

4. A rubber insulated wire, the rubber portion of which is of the super-ageing type and normally adapted for curing in steam, which rubber portion is characterized in containing besides an organic accelerator, some but not more than approximately 1% by weight of magnesium oxide based on the rubber whereby to prevent porosity during the cure in steam.

5. A rubber insulated wire, the rubber portion of which is of the super-ageing type and normally adapted for curing in steam, which rubber portion is characterized in containing besides an organic accelerator, some but not more than approximately 1% by weight of calcined magnesia based on the rubber whereby to prevent porosity during the cure in steam.

6. A rubber insulated wire, the rubber portion of which is of the super-ageing type and normally adapted for curing in steam, which rubber portion is characterized in containing besides an organic accelerator, some but not more than approximately 1% by weight of heavy calcined magnesia based on the rubber whereby to prevent porosity during the cure in steam.

ERNEST B. CURTIS.